United States Patent [19]

Takamatsu

[11] 4,173,283

[45] Nov. 6, 1979

[54] SUPPORT STRIP FOR READY-FOR USE ARRANGEMENT OF SLIDERS IN THE MANUFACTURE OF SLIDE FASTENERS

[75] Inventor: Ikuo Takamatsu, Uozu, Japan

[73] Assignee: Yoshida Kogyo Kabushiki Kaisha, Chiyoda, Japan

[21] Appl. No.: 533,243

[22] Filed: Dec. 16, 1974

[30] Foreign Application Priority Data

Dec. 24, 1973 [JP] Japan ................................. 49-1795

[51] Int. Cl.² ............................................ B65D 73/00
[52] U.S. Cl. ..................................... 206/338; 29/408; 206/493
[58] Field of Search ............... 206/338, 343, 348, 820, 206/493, 329; 24/205.11 R, 205.15 R, 205.15 E; 269/49; 29/408, 409, 410, 630; 229/69

[56] References Cited

U.S. PATENT DOCUMENTS

| 2,259,358 | 10/1941 | Templeton | 229/69 |
|---|---|---|---|
| 2,838,831 | 6/1958 | AuBuchon | 269/49 |
| 3,078,558 | 2/1963 | Langwell | 29/408 |
| 3,116,544 | 1/1964 | Fisher | 29/408 |
| 3,171,535 | 3/1965 | Harris | 206/329 |
| 3,227,270 | 1/1966 | Floyd, Jr. | 206/338 |

Primary Examiner—William T. Dixson, Jr.
Attorney, Agent, or Firm—Bucknam and Archer

[57] ABSTRACT

A support strip preferably made of resilient material and adapted to permit a number of sliders to be removably mounted astraddle one of the longitudinal edges thereof for the sake of convenience in storage. A longitudinal row of spaced apart apertures is formed through the support strip substantially the full length thereof, such that when the sliders are later required for the assemblage of complete slide fasteners, the sliders can be fed to a desired assemblying machine with the support strip running over a sprocket having its teeth engaged in the successive apertures formed therein. A reciprocable push rod may be employed for removal of the successive sliders from the support strip.

6 Claims, 8 Drawing Figures

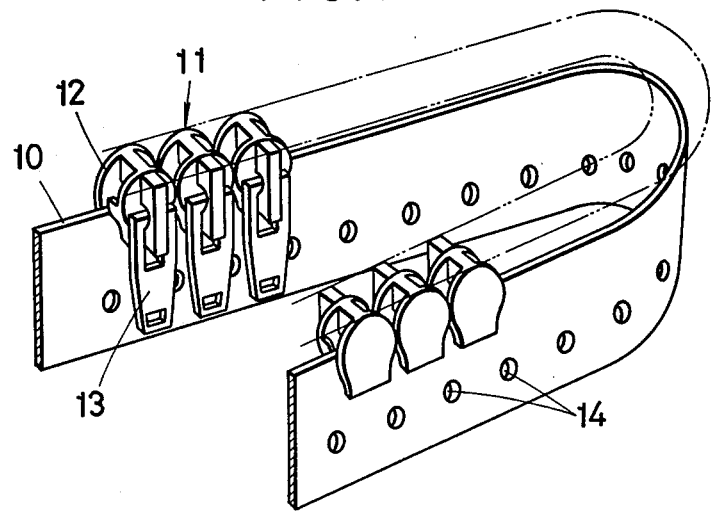
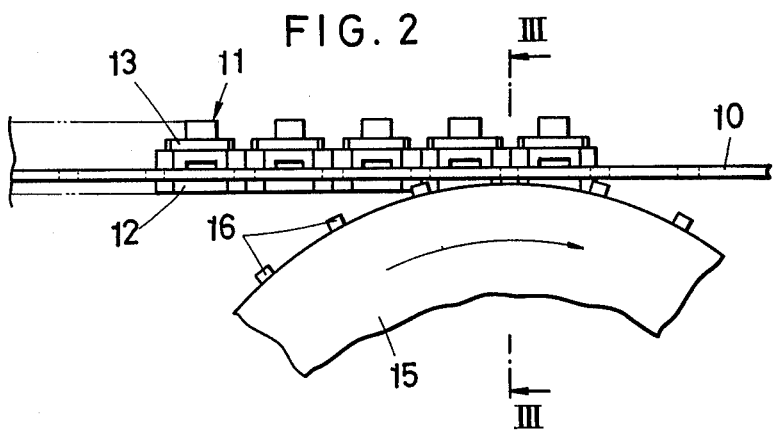
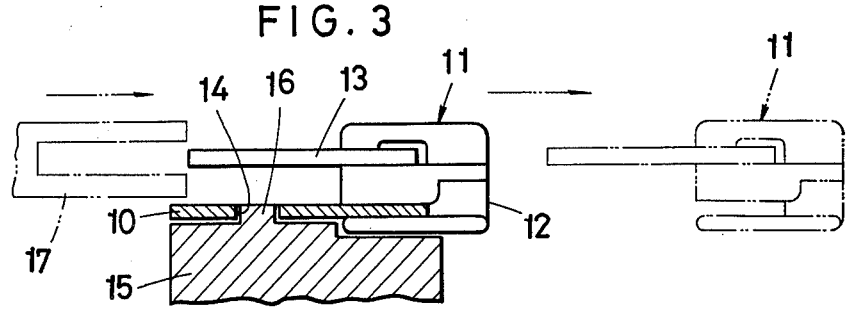

SUPPORT STRIP FOR READY-FOR USE ARRANGEMENT OF SLIDERS IN THE MANUFACTURE OF SLIDE FASTENERS

BACKGROUND OF THE INVENTION

This invention relates generally to the art of slide fastener manufacture, and more particularly to novel and improved means for orderly or methodical arrangement, and for delivery to a desired assemblying machine, of sliders that are not yet attached to slide fastener stringers. The invention has been conceived with a particular view to convenience in the storage of the sliders and to the ease of handling thereof in the assemblage of complete slide fasteners.

In the slide fastener manufacturing industry, the sliders which have been produced but which are not yet attached to stringers have customarily been stored in random arrangement within wooden boxes or other suitable containers. Thus, when the sliders are later to be used in the final assemblying or sewing operation of slide fasteners, complex and bulky feed mechanisms have had to be employed for the controlled delivery of the sliders to the machinery used for such operation.

SUMMARY OF THE INVENTION

It is, therefore, an object of this invention to provide a novel and improved support strip for holding in neat arrangement the sliders which have been produced but which are not yet attached to slide fastener stringers.

Another object of the invention is to provide a slider support strip which, when the sliders are required for the final assemblying operation of the slide fasteners, can be stably supported and guided for the delivery of the successive sliders to the desired assemblying machine, totally without need for the use of the complex and bulky feed mechanisms that have been conventionally in use.

A further object of the invention is to provide a slider support strip which permits the sliders arranged thereon to be smoothly and readily removed therefrom one by one exactly where the sliders are required for the assemblage of the slide fasteners.

A still further object of the invention is to provide a slider support strip which permits the orderly and readily accessible storage of the sliders which have been classified according to their shape, size, material, color or like distinctive features.

Summarized briefly, the invention aims at the provision of a support strip adapted to permit a number of sliders to be removably mounted astraddle one of the longitudinal edges thereof in side-by-side relationship. The support strip has at least a row of spaced apart apertures arranged longitudinally substantially the full length thereof. Thus, for the delivery of the sliders to a desired assemblying machine, a sprocket can be used which rotates with its teeth successively engaged in the apertures in the support strip. Removal of the successive sliders from the support strip can be effected either manually or by means of a push rod moving to and fro across the support strip as the sprocket is periodically set out of rotation.

The features which are believed to be novel and characteristic of this invention are set forth in particular in the claims appended hereto. The invention itself, however, both as to its organization and mode of operation, together with the further objects and advantages thereof, will become apparent in the course of the following description, when read in conjunction with the accompanying drawings in which some preferred embodiments of the invention are disclosed, and in which like reference characters denote like parts throughout the several views.

BRIEF DESCRIPTION OF THE DRAWINGS

FIG. 1 is a perspective view of a support strip with sliders removably mounted thereon in accordance with the novel concepts of this invention;

FIG. 2 is a fragmentary side elevational view showing the sliders being fed to a desired assemblying machine by the support strip of FIG. 1 cooperating with a sprocket;

FIG. 3 is a sectional view taken along the plane of line III—III in FIG. 2;

DESCRIPTION OF THE PREFERRED EMBODIMENTS

Figure 4:
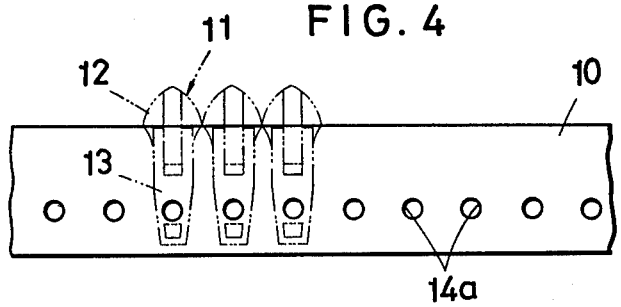
FIGS. 4 to 7, inclusive, are plan views of the support strip according to the invention, the views being explanatory of the various possible shapes and arrangements of apertures formed in the support strip.

With particular reference to FIG. 1, the reference numeral 10 designates a preferable form of the slider support strip according to the invention. Preferably, the support strip 10 is made of paper, plastics, rubber, sheet metal or like material that will lend suitable resiliency to the support strip produced. The length of this support strip may be suitably determined in consideration of convenience in handling. Along one of the longitudinal edges of the support strip 10 there are removably mounted a row of sliders 11 in close side-by-side relationship.

The sliders for use with the support strip according to the invention can be practically of any type or configuration known in the art and employed for the manufacture of usual slide fasteners. The illustrated slider 11, for example, includes a body 12 having a pull tab 13 pivotally connected thereto and itself comprising a pair of spaced apart wings or plate members which are interconnected at one end by a web to define a generally Y-shaped guide channel through the slider body.

It will be seen from a consideration of FIG. 1 that each slider 11 is mounted astraddle the said one longitudinal edge of the support strip 10, in such a manner that the longitudinal edge portion of the latter is relatively snugly received between the top and bottom wings of the slider body 12. The sliders are thus each arranged transversely with respect to the longitudinal direction of the support strip 10.

According to a feature of this invention, the support strip 10 has a longitudinal row of spaced apart apertures 14 therethrough which extends substantially the full length of the support strip. These apertures 14 must be so positioned with respect to the transverse direction of the support strip 10 that they will not be covered by the bodies 12 of the sliders 11 when the sliders are mounted astraddle the prescribed longitudinal edge of the support strip.

Although not shown in the drawings, it will be seen that the support strip 10 with the sliders 11 removably mounted thereon can be coiled around a reel or, alternately, can be folded in a zigzag fashion and accommodated in a suitable receptacle, for the sake of convenience in storage. When the sliders are later required for the assemblage of complete slide fasteners, the support strip 10 with its sliders 11 may be unwound from the rotatably supported reel or may be taken out of the receptacle from one of its ends.

As illustrated in FIGS. 2 and 3, the support strip 10 can advantageously be used in combination with a sprocket 15 for feeding the sliders 11 to a desired assemblying machine. The sprocket 15 is assumed to be supported for rotation in a vertical plane and has a plurality of circumferentially spaced apart teeth 16 for engagement in the respective apertures 14 in the support strip 10. Thus, as the sprocket 15 is rotated in the direction marked by the arrow in FIG. 2, the support strip 10 unwound from the reel or taken out of the receptacle will be fed in the right hand direction, as viewed in the same drawing, in a horizontal plane.

For releasing the successive sliders 11 from the support strip 10, the rotation of the sprocket 15 may be periodically suspended, and while the support strip is at rest, a reciprocable push rod 17 shown in FIG. 3 may be thrusted forward across the support strip, in a direction at right angles therewith, to press against each foremost slider from the rear end of its body. Since the support strip 10 is fixedly supported over the toothed circumference of the sprocket 15, the slider can then be removed therefrom for delivery to the assemblying machine as indicated by the dot-and-dash lines in FIG. 3.

It is also possible, however, for the operator of the assemblying machine to manually remove the successive sliders 11 from the support strip 10 running over the sprocket 15 and hence to dispense with the push rod 17 and its actuating mechanism.

FIGS. 4 to 8, inclusive, represent the various possible shapes and arrangements of the apertures 14 to be formed in the support strip 10. For most practical purposes, each aperture can in shape be circular, as shown at 14a and 14c in FIGS. 4 and 6, or square, as shown at 14b in FIG. 5. If desired, however, each aperture may be defined by partly raising the support strip along a V-shaped incision formed therein, as indicated at 14d in FIGS. 7 and 8.

Figure 5:
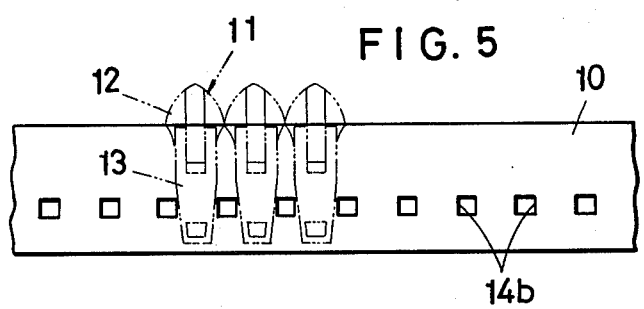
Figure 6:
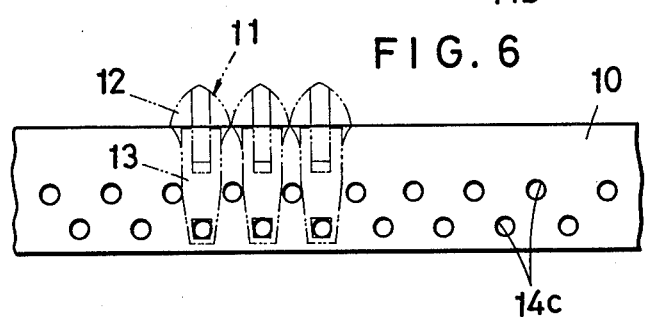
Figure 7:
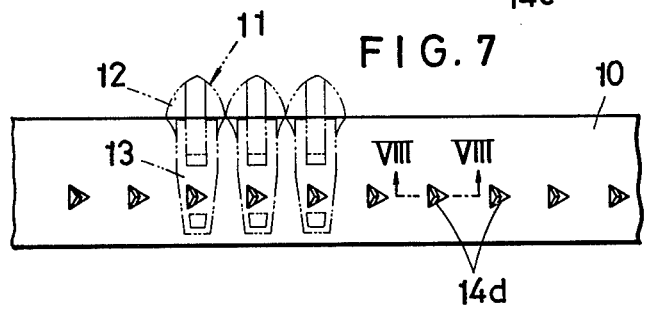
Figure 8:
FIG. 8 is a sectional view taken along the plane of line VIII—VIII in FIG. 7.

The positions of the apertures 14 relative to the sliders 11 mounted astraddle the longitudinal edge of the support strip 10 may be such that the pull tabs 13 of the sliders extend over the respective apertures, as shown in FIGS. 4 and 7, or lie between the adjacent apertures, as shown in FIG. 5. It is also possible to arrange the apertures in two parallel rows, as illustrated in FIG. 6, perhaps with the apertures of one row staggered with respect to those of the other.

Regardless of the specific shapes and arrangements of the apertures hereinbefore set forth, it is imperative that such apertures should not be covered by the bodies 12 of the sliders 11 removably mounted in position on the support strip 10, for reasons that will be evident from the foregoing description of FIGS. 2 and 3.

Having thus described the invention, it is clear that the objects as above stated have been attained in a simple and practical manner. However, while the invention has been shown and described in very specific aspects thereof, it is to be understood that changes may be made in the construction and arrangements of the various parts without departing from the spirit and scope of the invention as expressed in the following claims.

What is claimed is:

1. An apparatus for conveying sliders for use in the manufacture of slide fasteners, the sliders being of the type including a body having a pair of wings which are interconnected at one end of said body, which apparatus comprises a movable elongated support strip having a continuous longitudinal edge portion disposed for insertion between the wings of each slider body to releaseably support same, in a generally fixed position relative to the support strip and means defining a plurality of apertures spaced apart longitudinally on said support strip and disposed for engagement by a drive means to move said strip and sliders supported thereby.

2. An apparatus according to claim 1 wherein said apertures are located in a single longitudinal row.

3. An apparatus according to claim 1 wherein said apertures are located in a plurality of parallel spaced, longitudinally extending rows.

4. An apparatus according to claim 1 wherein said apertures are generally circular.

5. An apparatus according to claim 1 wherein said apertures are generally rectangular.

6. An apparatus according to claim 1 wherein said apertures are generally triangular.

* * * * *